United States Patent
Blake et al.

(10) Patent No.: US 7,699,223 B2
(45) Date of Patent: Apr. 20, 2010

(54) RETAIL INFORMATION COLLECTION

(75) Inventors: Phil Anthony Blake, Bondi Junction (AU); Robert Henry Best, Maroubra (AU)

(73) Assignee: Retail Information Systems Pty Ltd, Bondi Junction, NSW (AU)

( * ) Notice: Subject to any disclaimer, the term of this patent is extended or adjusted under 35 U.S.C. 154(b) by 85 days.

(21) Appl. No.: 11/839,538

(22) Filed: Aug. 16, 2007

(65) Prior Publication Data

US 2009/0045260 A1 Feb. 19, 2009

(51) Int. Cl.
*G06Q 90/00* (2006.01)

(52) U.S. Cl. .......................... 235/385; 705/22
(58) Field of Classification Search ................. 235/385; 705/20, 21, 22, 28
See application file for complete search history.

(56) References Cited

U.S. PATENT DOCUMENTS

| | | | | |
|---|---|---|---|---|
| 5,978,772 | A * | 11/1999 | Mold | 705/16 |
| 7,065,463 | B2 * | 6/2006 | Zhang | 702/101 |
| 7,464,050 | B1 * | 12/2008 | Deaton et al. | 705/26 |
| 7,464,859 | B1 * | 12/2008 | Hawkins | 235/379 |
| 2001/0044751 | A1 * | 11/2001 | Pugliese et al. | 705/26 |
| 2004/0103147 | A1 * | 5/2004 | Flesher et al. | 709/204 |
| 2005/0049965 | A1 * | 3/2005 | Jen | 705/39 |

* cited by examiner

*Primary Examiner*—Michael G Lee
*Assistant Examiner*—Tabitha Chedekel
(74) *Attorney, Agent, or Firm*—Molins & Co.

(57) ABSTRACT

An apparatus for collecting and transmitting a retail data comprising a barcode data of the products purchased over each transaction. The apparatus comprises a terminal device that has loaded onto it a retail information collection application that receives, stores, processes, and transmits the retail data. Financial data such as credit card numbers and personal identification numbers are removed from the retail data before it is encrypted and transmitted over a network to a retail database. Clients including but not limited to goods suppliers and goods manufacturers may view retail data, including sales history and sales performance, on one or more products.

20 Claims, 10 Drawing Sheets

RETAIL INFORMATION COLLECTION

FIELD OF THE INVENTION

This invention relates to retail information collection, in particular, collection of barcode data from retailed products.

BACKGROUND OF THE INVENTION

The collection and analysis of retail sales information is an important part of a manufacturer or distributor's marketing and advertising strategy. A manufacturer can better target its marketing resources if up to date information regarding product sales performance is known. One way of collecting this information is to survey product stocking information from various retail locations. The process can be time consuming because there may be many retail outlets in a certain area. Further, it is not always possible to obtain accurate or timely records from the owner of a store. Thirdly, some retailers infrequently order shipments for restocking. It is difficult for a manufacturer to obtain up to date clues about the performance of its products from these retailers.

OBJECT AND SUMMARY OF THE INVENTION

It is an object of the invention to obtain up to date retail information across various retail outlets.

It is another object of the invention to harvest up to date retail information by collecting data from barcode scans.

It is a further object of the invention to provide a process automation paradigm that manages the procurement, processing, and delivery of retail data.

Accordingly, there is provided an apparatus for retail information collection. The apparatus comprises a Y-cable that routes data from an input port simultaneously to two output ports. The input port is connected to a barcode scanner. One output port is connected to a card reader and the other output port is connected to an electronic cash register. The card reader has loaded onto it a software comprising a retail information collection application. The application is adapted to process the barcode data and transmit a retail information data over a network. The retail information data is based on the barcode data.

BRIEF DESCRIPTION OF THE DRAWING FIGURES

In order that the invention be better understood, reference is now made to the following drawing figures in which:

FIG. 2 (*b*) is a schematic diagram of another barcode collection set-up;

BEST MODE AND OTHER EMBODIMENTS

A retail information network captures sales information across one or more retail stores by collecting the barcode scan data from these stores. The network securely collects and transmits this data for processing every time a new transaction occurs. The network hence harvests real time or close to real time sales data.

For the purpose of this specification, users of the network are merchants or retailers who participate in the network and permit barcode scan data to be transmitted over the network. Customers are consumers who shop at the users' stores. Clients of the network are manufacturers, distributors, vendors, users or other suppliers who can log onto the network to view the sales data derived from the scan data.

Figure 1:
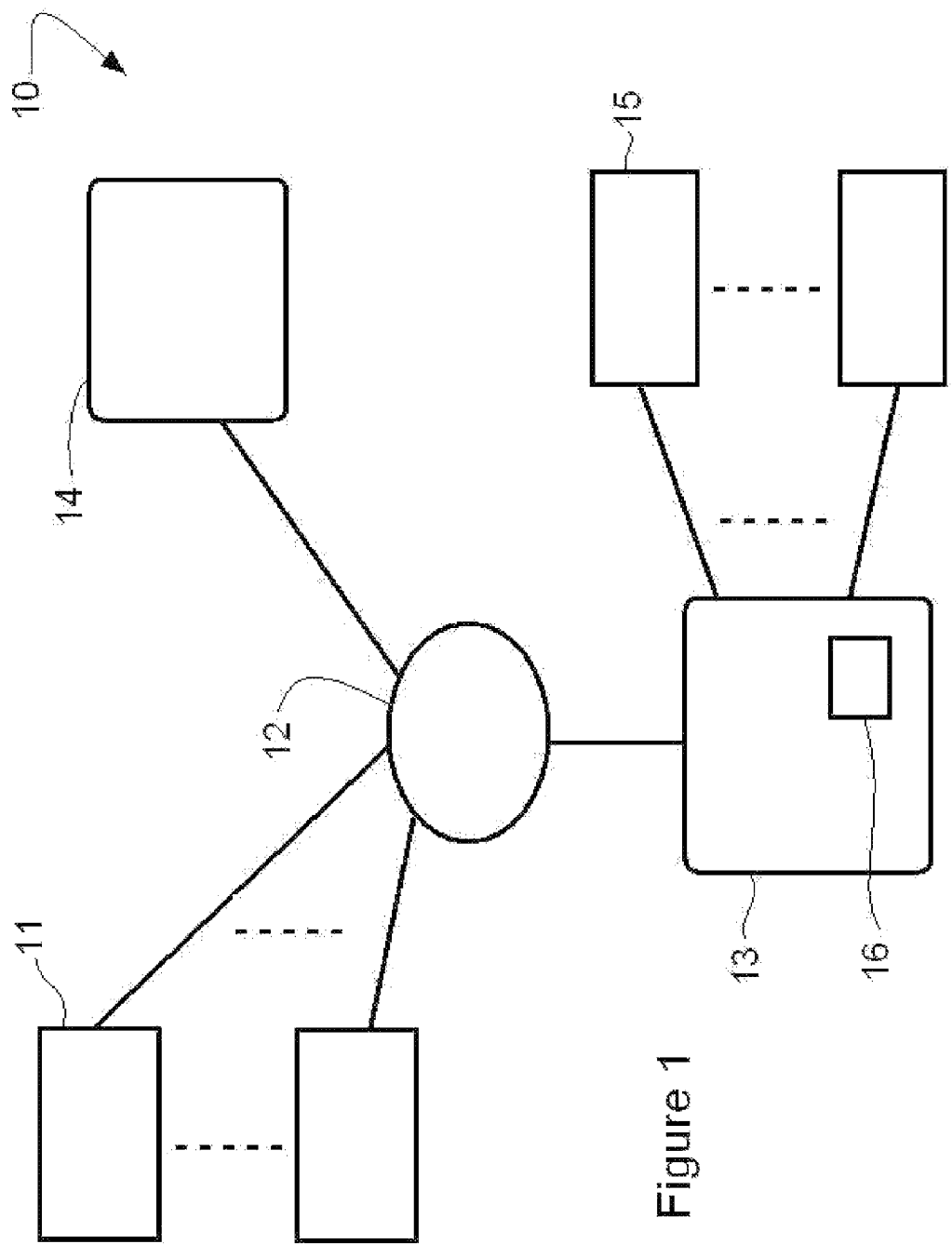
FIG. 1 is a schematic diagram showing an overview of a retail information network.

Referring to FIG. 1, the network 10 comprises one or more barcode collection set-ups 11. Each set-up 11 is located at a retail location where barcode data is collected. Some of the information collected from the set-up 11 is transmitted over a communications network 12 to a host 13. In embodiments where electronic payments are permitted by the set-up 11, banking and payment information is sent over the communications network 12 to a banking or financial institution 14. The communications network 12 can be, without limitation, a dial-up network, a wireless network, a TCP/IP network, or an ISDN network. Preferably, at least two network connection types are supported by the barcode collection set-up. One network connection may be used as a backup communications network in the event that the default communications network fails. The host 13 manipulates the received scan data and allows a client 15 to access the data or information compiled from the data. In some embodiments, the host 13 does so by supporting an interactive website 16 that the client 15 can log into.

Figure 2:
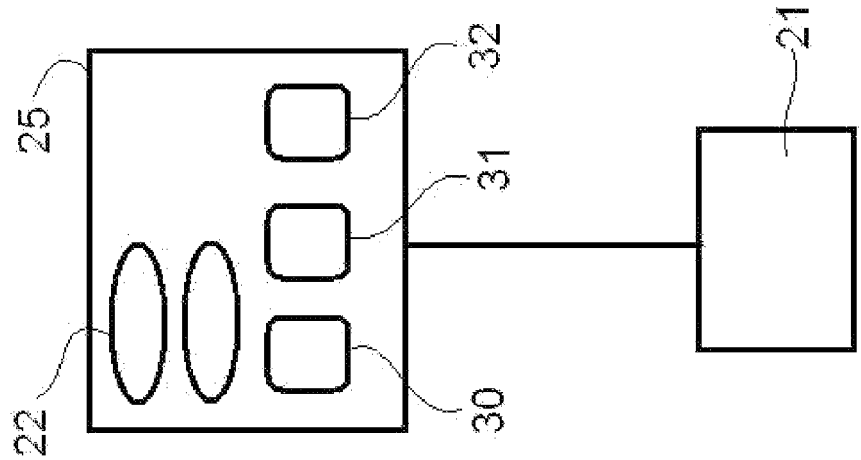
FIG. 2 (*a*) is a schematic diagram of a barcode collection set-up.
Figure 2:
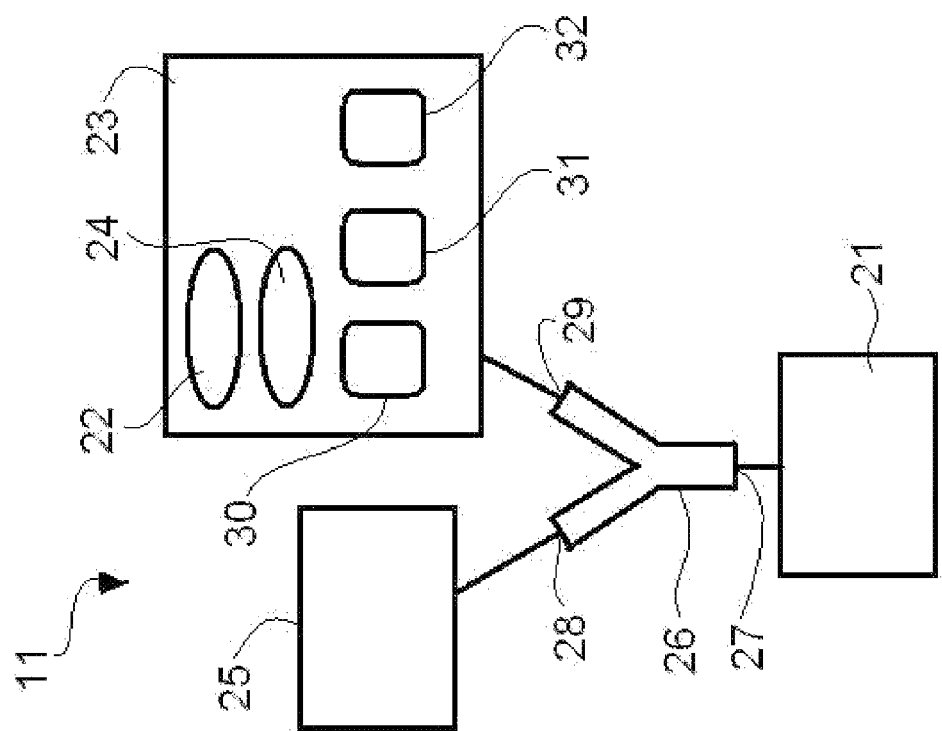

Referring to FIG. 2, a barcode collection set-up 11 includes a barcode scanner 21 that scans barcodes printed on the packaging of products. The scanned data is transmitted to a retail information application 22 that gathers and manages the deployment of the data. It should be noted that this data is not limited to the product barcode. The data includes other information, such as time of purchase, number of items in the basket, total purchase amount, product name or category, etc.

In the preferred embodiment, the software application 22 that interacts with the host 13 resides in a card terminal (or "card reader") 23 for debit cards or credit cards, regardless of whether or not there is already a payment application 24 in the terminal 23. The scanned data originating from the barcode scanner 21 is routed to both the cash register (or "point of sale device") 25 and the card terminal 23. It is the retail information application 22 in the card terminal 23 that communicates with the host 13 over the communications network 12.

To facilitate this data routing, a Y-cable 26 is provided between the three devices. The Y-cable 26 has an input port 27 that is connected to the barcode scanner 21. The Y-cable 26 also has a first output port 28 that is connect to the cash register 25 and a second output port 29 that is connected to the card terminal 23. The Y-cable 26 splits the data stream from the scanner 21 into two parallel, identical data streams that are simultaneously received by the card terminal 23 and the cash register 25.

Customers may purchase several items at one time. It is thus preferred that the card terminal 23 has a display area 30 that is large enough to show multiple lines of data that are based on barcodes from items belonging to one purchase basket. It is further preferred that the card terminal has a printer 31 that can print out messages issued by the retail information application 22 or by the host 13.

In other embodiments, the machine 23 in which the retail information application 22 resides (or "application device") may be the cash register 25 itself, and the Y-cable 26 is not needed. The requirement for selecting the application device 23 is that it has sufficient memory 32 for supporting the retail information application 22 and has a display area 30 for displaying barcode information and the retail information application's user interface.

Figure 3:
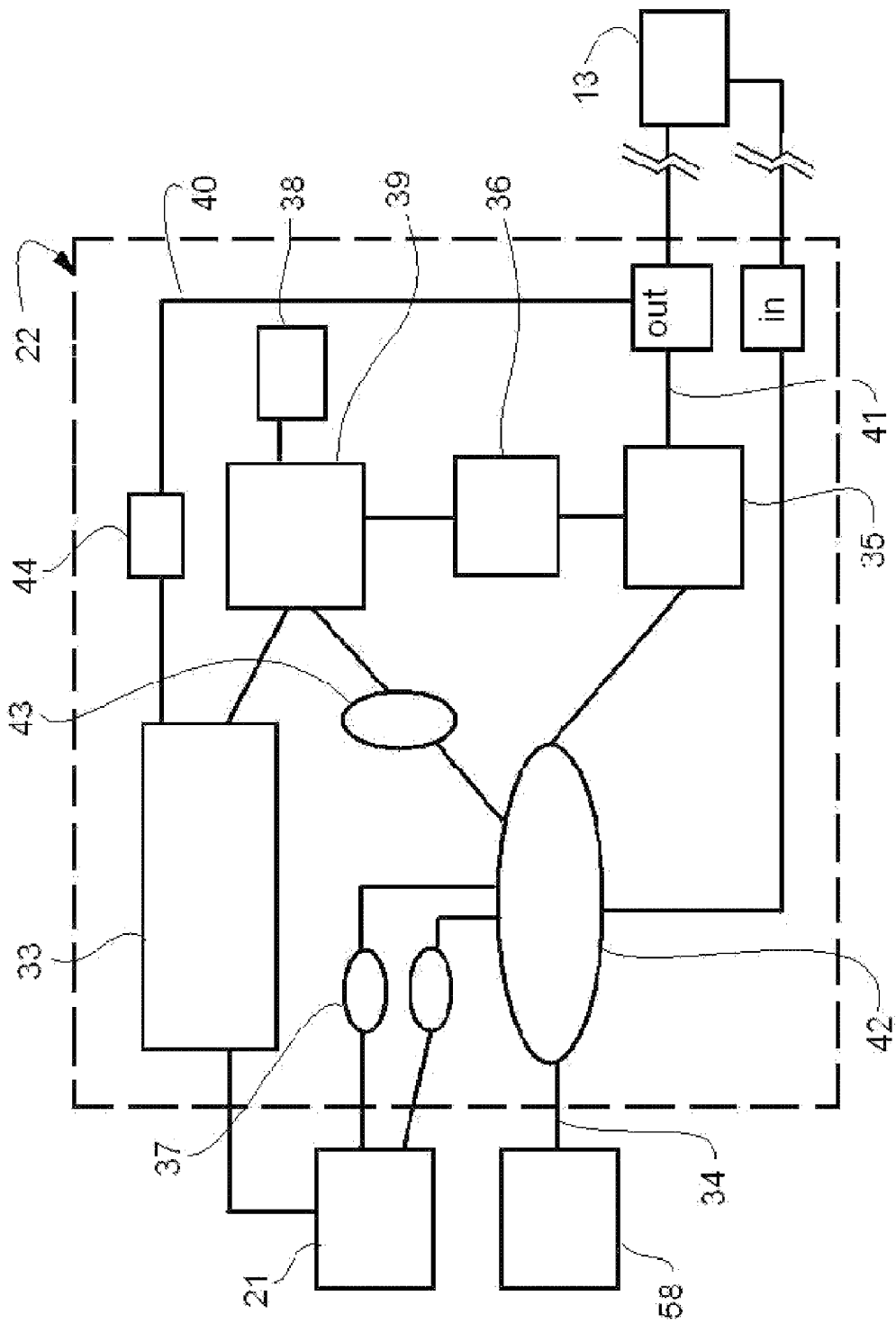
FIG. 3 is a schematic diagram of the retail information application.

Referring to FIG. 3, the retail information application 22 has various functions. These functions include application initialisation 33, logging onto the host 40, allowing manual barcode entries 34, sanitizing and encrypting data 35, transmitting sanitized and encrypted data to the host 41, and interfacing with the user. Sanitizing a data segment means filtering out, from that data segment, any personal details and personal banking or credit card details. Retail information data, which is based on the barcode data and further comprises personal banking data and other purchase data, is sanitized prior to being sent to the host.

The retail information application 22 also various components or modules to facilitate these functions, such as a data stream receiver 42 (also "memory" or "memory bank") that receives barcode data or messages from the host, a built-in timer 36 for time-stamping the barcode data and for automated deployment of sanitized and encrypted data, various buffer ports 37 to allow temporary storage of data from the scanner 21, a user management module 38 for personalized control of barcode collection, a user interface 39 that allows a user to monitor the barcode collection and operate the application device, and a product list compiler 43 that compiles the information that the retail information application displays to the user. The aforementioned functions and components will be now discussed in greater detail.

The memory 42 receives and stores data from the barcode scanner 21. The retail information application 22 idles in the background normally, but becomes active when it detects barcode information within the memory bank 42. The memory 42 also stores messages from the host 13.

Figure 4:
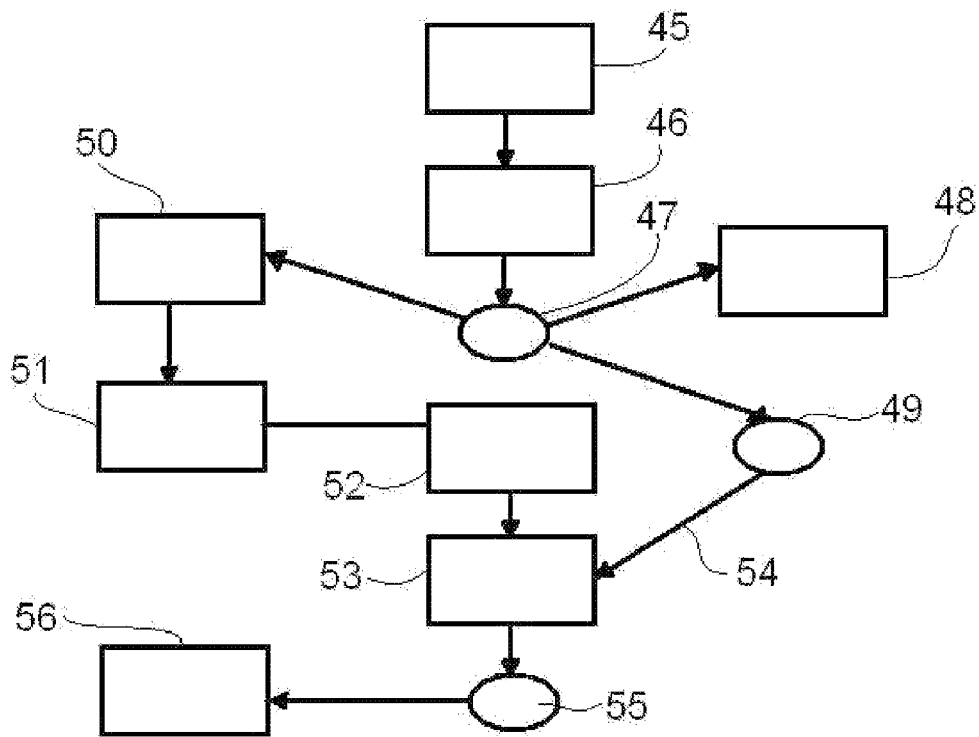
FIG. 4 is a flowchart showing the application initialisation process.

As shown in FIGS. 3 and 4, for the data connection between the retail information application 22 and the host 13 to be established, the application 22 needs to log onto the host 13. The retail information application 22 thus has a host log-on module 44. The log-on module 44 has two functions. First it initialises an application device. Initialization of the application device 23 only needs to be performed once. Secondly it attempts to log-onto the host 13 after an initialized application device is switched on.

To initialize the application device 23, the log-on module 44 determines the configuration of the barcode scanner 21. In one embodiment, this determination has various stages, each stage accounting for a different type of barcode. In the first stage, the retail information application 22 asks the user to scan a first barcode 45. The application 22 then attempts to read the barcode using a combination of various baud rates, different parities, and numbers of data bits 46, until the barcode is successfully read 47. Once the retail information application successfully reads the barcode 47, it remembers any prefixes associated with the first barcode 48. It also remembers the data link layer configurations 49. Preferably, the successful completion of this stage causes the application device to issue a sound pattern 50 such as a beep. The beep alerts the user that a valid barcode has been successfully read. The user then enables a subsequent stage of configuration stage to commence 51, for example, by pressing an ok button on the application device. In the subsequent stage, the user scans a second barcode that is of a different type than the first barcode 52. The retail information application attempts to read the second barcode 53 using the same data link layer configuration that was detected successfully in the first stage 54. Again after a successful reading of the second barcode 55, the retail information application 22 remembers any prefixes used for the second barcode 56. Note that the determination of barcode configuration only needs to be performed once, usually at the initialization of the application device.

The log-on module 44 uploads user details and the detected data configuration to the host 13. The host 13 responds to the log-on module 44 to indicate whether the log-on has been successful. In embodiments where the application device also includes a payment application and connects to a financial institute, the log-on to the host 13 is performed after the log-to the financial institute.

Figure 5:
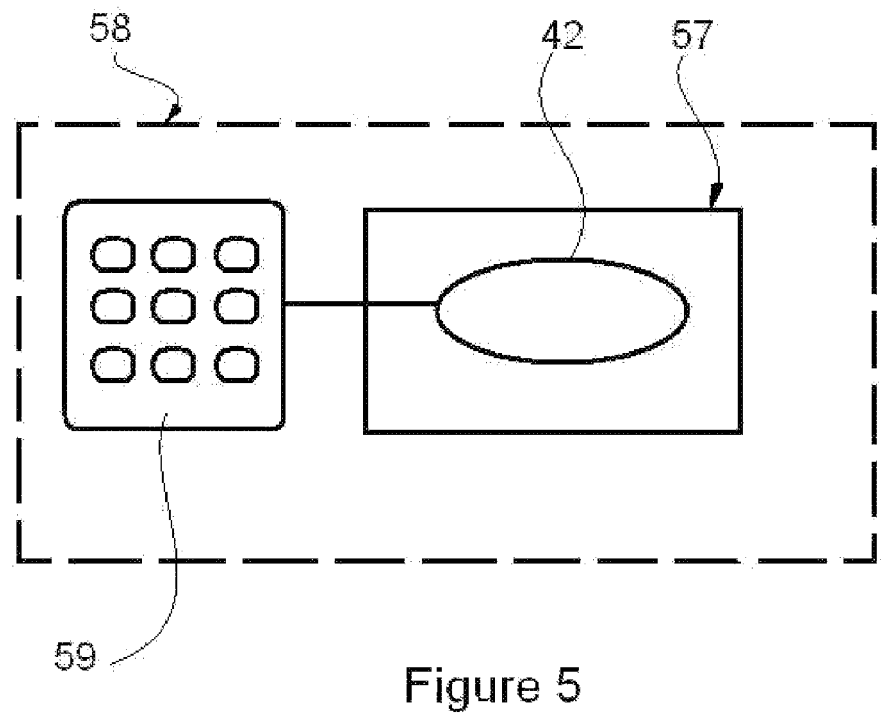
FIG. 5 is a schematic diagram showing the manual override module.

As shown in FIG. 5, to account for unexpected errors in the barcode scans, the retail information application 22 preferably has an override module 57. The override module 57 allows the user to manually enter the barcode. To support the manual barcode entry, the application device 58 is provided with accessories such as a key pad 59.

Figure 6:
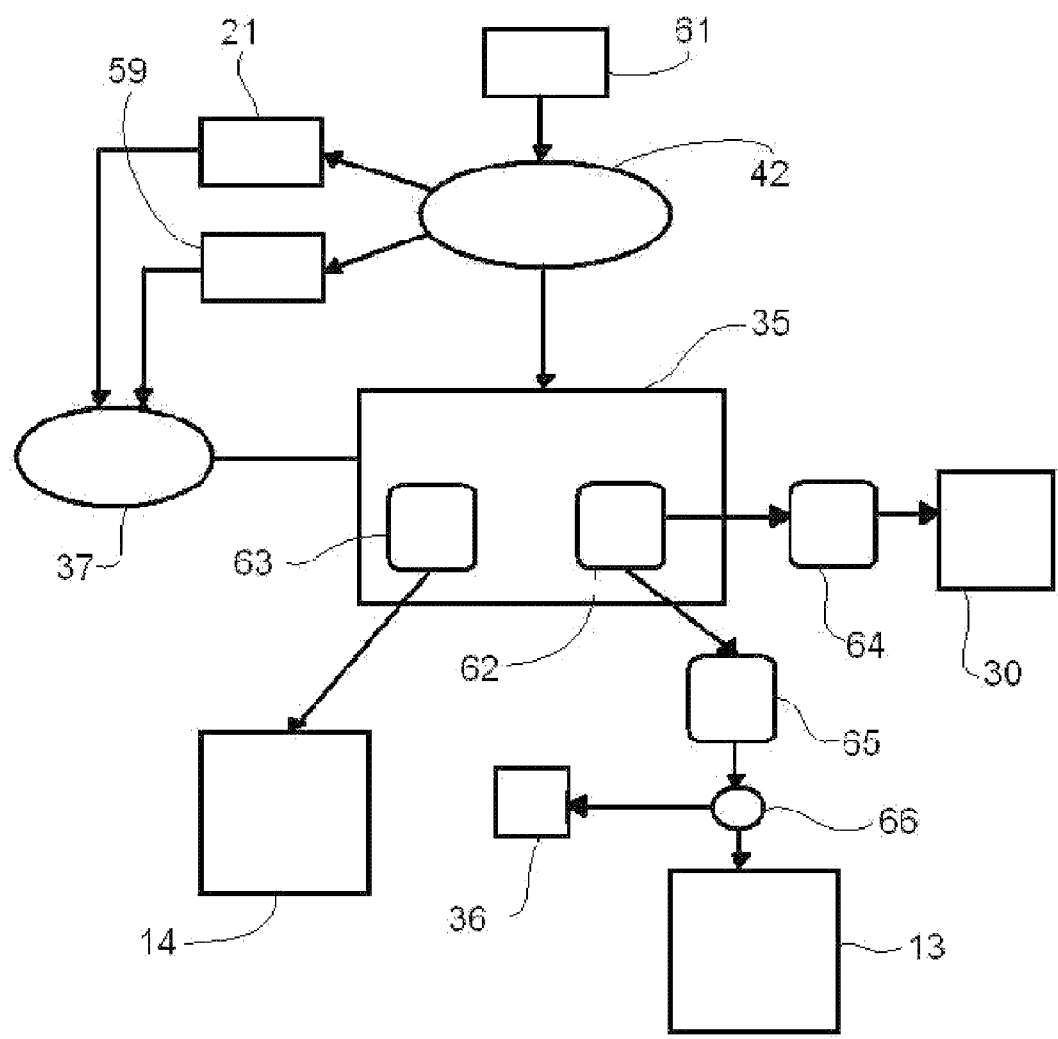
FIG. 6 is a schematic diagram depicting a portion of a retail information network.

As shown in FIG. 6, barcode obtained from the scanner 21 or entered from the key pad 59 is stored into the memory bank 42. In embodiments where the application device 60 is a credit or debit card terminal, the application device 60 further has a card reader such as a magnetic card reader 61. Personal banking data including card information and personal identification numbers associated with a card is also sent to the memory bank 42. In these embodiments the retail information application 22 selectively transmits the data to the host 13, and does not send any personal banking details to the host 13.

The encryption module 35 determines which portion of the data can be transmitted to the host 13 and which portion cannot. The portion of the data that can be transmitted to the host 13 is referred to here as the "sanitized data" 62. The encryption module 35 further encrypts the sanitized data to prepare it for transmission to the host 13. The encryption module 35 preferably complies with security standards issued by the banking community, because it handles barcode information as well as banking information 63. The term "retail information" refers to data comprising both the barcode information and the banking information.

Sanitized data 62 is populated into a product list 64. A user can view this list 64 from the display area 30. The list 64 continues to be populated with more lines of barcodes while more barcodes are scanned or entered. In the event that the application device 60 is busy performing other tasks and not actively populating the list 64, the barcodes will remain within the auxiliary port buffer 37 and will be processed at the next opportunity.

The retail information application 22 sends the sanitized and encrypted data 65 over the communications network 12 to the host 13. The deployment of the encrypted data may be timed so as to ensure all of the items in a customer's purchase basket have been scanned before retail information is deployed. In the preferred embodiment, the retail information application 22 has a built-in timer 36. The timer 36 determines the elapsed time ("pause") since the latest detection of a barcode entry. The process 66 responsible for deploying the sanitized and encrypted data 65 sends the encrypted retail information data to the host 13 after the pause reaches a predetermined length of time.

There can be more than one person who works at a particular retail shop. Different people working at the same retail shop may need different access levels to the barcode collection set-up 11. For example, a shop owner may have a higher access level and can add or delete access accounts for other users, a full-time staff can temporarily disable barcode scans to add new product lines, whereas a part-time staff can only perform the basic barcode scans. Hence it is preferred that the retail information application 22 has a user management module 38 that allows different tiers of control for different users in the same shop. The user management module 38 can be used to set up user accounts 39, and to grant different users various access levels as required.

In order that the user can operate the barcode collection set-up 11 as required, the retail information application 22 has a user interface 38. The user interface 38 is viewable by the user via the display area 29. The user can select functions to manage the barcode collection process and or the user accounts. For example, the application device 33 may have a "menu" button. A user can press this menu button to select from a list of tasks that the user can perform. These tasks can be, without limitation, initializing the retail information application 22, logging onto the host 13, beginning barcode scans, and managing user accounts. After the user starts scanning barcodes, the interface may offer a list of secondary commands, such as disable barcode collection, resume barcode collection, cancel barcode scan, or manual barcode entry. The interface may further let the user scroll through the product list using commands such as "next" and "previous".

Aside from responding to log-on requests, the host 13 decrypts the incoming encrypted data. The decrypted data is then manipulated by various data processing applications resident on the host's server or a friendly third-party server. The processed data and statistics generated from the data are then made available to clients. The host's server or third-party server may run a website or a family of websites that are accessible by authorized clients. Authorized clients can log-onto these websites and browse the retail data as required. In preferred embodiments, there are different levels of authorisations for the clients. For example, the retail data may be organized into various linked or individual databases. A client with a higher level of authorisation may be able to search retail data from a wider collection of databases (e.g. regional or national, yearly or monthly), or view more aspects of the retail data (e.g. data regarding performance of a certain product, or data regarding how a certain product performs in relation to a group of similar products).

The collection, sanitisation, encryption, and transmission of retail data occur at the barcode collection set-up and over the communications network in true or approximate real time (within seconds). Therefore clients can access up-to-date retail data, without having to negotiate data release from financial institutes, local retailers, or any other third-parties. The encryption and sanitisation process also ensures personal, financial, or banking details are only sent to authorised financial institutions.

In further embodiments, the retail information collection network 10 described above may be used to facilitate a reward (or "loyalty") program. A customer is issued a unique loyalty card and may receive a barcode-bearing voucher when his or her purchase level reaches a certain threshold. Using the retail information collection network 10, the customer's loyalty card data or voucher data is sent to and can be verified by the host 13. The updating of the customer's purchase or personal profile and the issuance of vouchers is done by the host 13. In some embodiments, the host may further support a website that a merchant can log into to view loyalty profiles of his or her customers.

Figure 7:
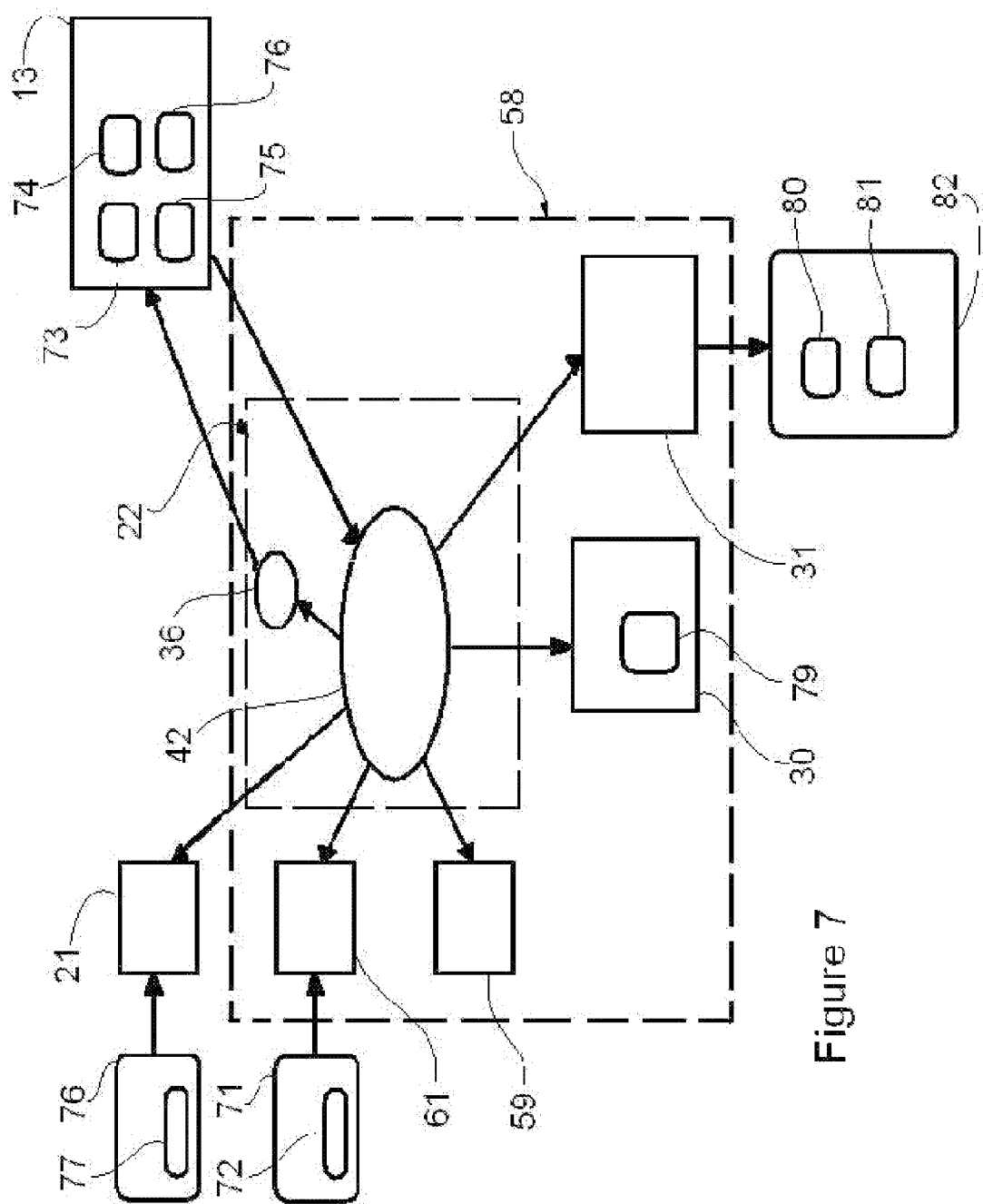
FIG. 7 is a schematic diagram depicting retail information network components that are involved in the reward program.

As shown in FIG. 7, each customer is issued a loyalty card 71 that has a unique program identifier 72. This identifier 72 may be encoded in a magnetic strip or may be a barcode. In the case that the identifier 72 is a magnetic strip, the application device 58 also includes a magnetized card reader 61. The loyalty card is swiped or scanned after the barcodes of all purchase items have been scanned. In some embodiments, the keypad 59 can also be used to manually enter the identifier 72. Reward program data (or "loyalty data") and barcode data both form the data stream that is sent to the memory 42.

In some situations, the merchant may not wish to award loyalty points for purchases made for certain items. For example, these may be sales items or items that have low profit margins. Alternatively, the merchant may wish to promote certain products by awarding extra loyalty points for these products. Hence, it is preferred that an operator can manually enter the dollar amount that will contribute to the total amount of loyalty points.

As mentioned previously, the deployment of data from the application device 58 to the host 13 occurs after a long enough pause has been detected after the last barcode scan. It is further preferred that deployment also occurs since a loyalty card is swiped or scanned, or after reward program identifier is entered, regardless of the length of pulse detected by the timer 36. A customer's reward program data is thus sent to the host 13 along with barcode data.

The host 13 has additional databases for data associated with the reward program, such as a voucher database 73, a loyalty card database 74 and a database for customer loyalty profiles 75. The host updates the customer's loyalty profile in the customer loyalty profile database 75. The host then determines whether or not the customer has accrued enough loyalty points for a voucher to be issued. In some embodiments, the host automatically issues a voucher when the customer's purchase amount exceeds a certain trigger value.

The host 13 sends reward program messages to the retail information application. For example, the message can be the total number of loyalty points the customer currently has or the number of loyalty points or purchase amount needed in order for the customer to earn a voucher. The reward message can also be a voucher that has been issued or generated by the host 13.

In the preferred embodiment, the host 13 matches the incoming reward program data with the loyalty card database 74 to verify that the loyalty card 71 is valid. If the card 71 is not valid, the host 13 sends an error message to the retail information application 22. The host 13 also verifies the validity of a voucher 76 by matching a voucher barcode 77 with existing voucher barcodes contained in the voucher database 73. The host 13 sends an error message to the retail information application if the incoming voucher barcode does not exist in the database, or if the incoming voucher barcode belongs to a voucher that has already been redeemed.

In further preferred embodiments, the reward program enabled by the retail information collection network lends itself to target marketing or advertising by different clients. For example, a client may offer a discount toward a future purchase of their product every time that a similar product of a competitor is purchased. In this case, the host may have a product marketing database 78 that associates a product with a promotional offer from the manufacturer (i.e. client). The host thus cross checks the incoming product barcode information with the product marketing database, and sends a promotional message to the retail information application.

The promotional message, reward message or error message is sent from the host to the retail information application. A message sent from the host to the retail information application, regardless of it nature, will be referred to as a "host message". The retail information application then sends the message to be printed or displayed. For example, an error message 79 may be displayed so that the operator knows to notify the customer that an invalid voucher has been presented. A reward message 80 and an advertising message 81 may be printed on a receipt 82 for the purchase. This transmission and subsequent printing or display of the messages occurs right away, rather than at a later stage. Thus the operator and the client are notified of any host message right away.

Figure 8:
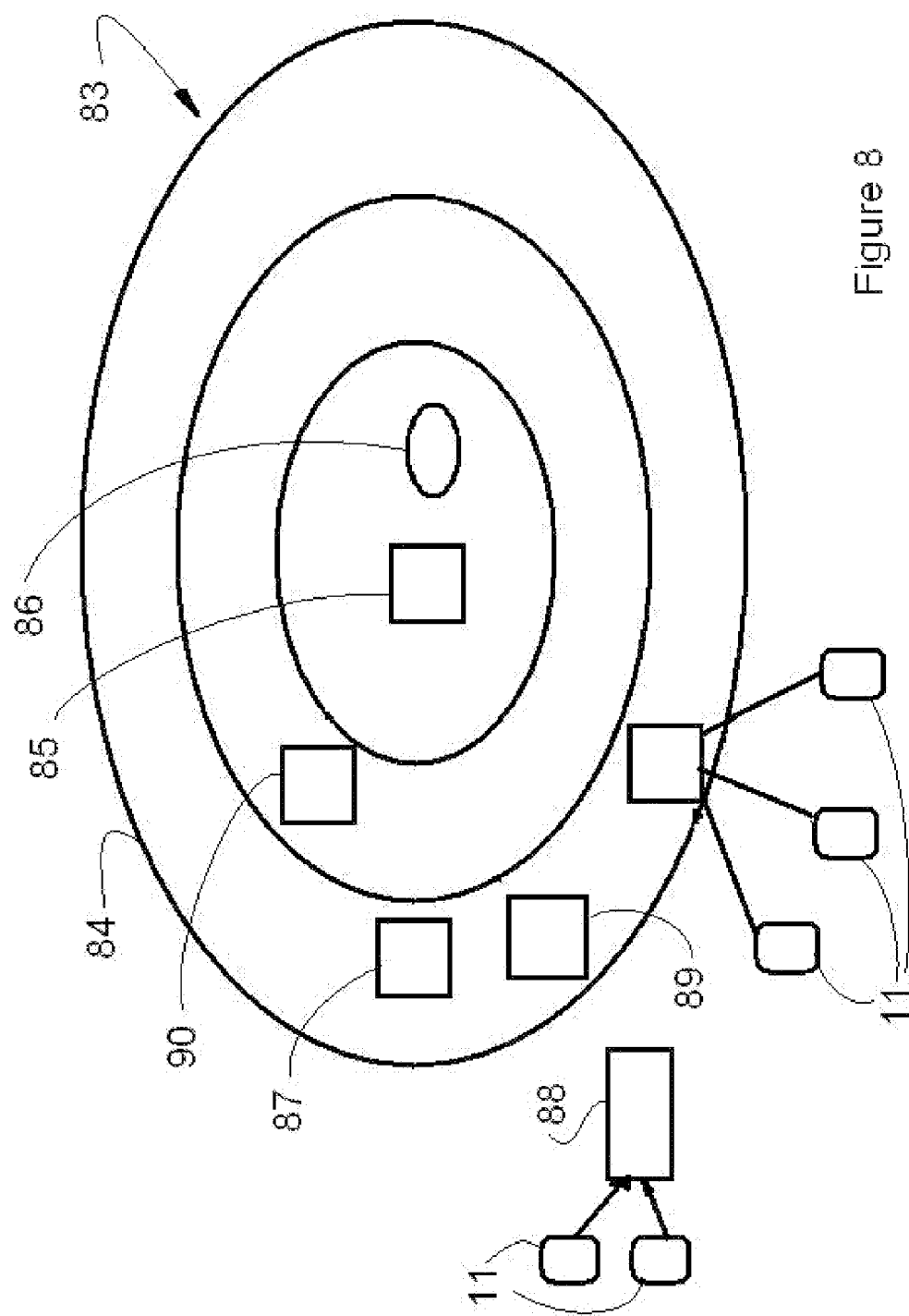
FIG. 8 is a schematic diagram depicting the distribution fabric.

The data traffic involved in the loyalty scheme and the collection of retail information may be enabled within a distributed database (or "distribution fabric"). Referring to FIG. 8, both data and software applications can be distributed throughout the fabric 83. Various resources, which may be utilized during different services, can be published on and shared across the fabric 83.

The fabric 83 consists of computers that are located at various locations and connected to the same communications network 84. Any one computer within the fabric 83 may have resident resources such as data or software applications. These resources are shared by all the other computers in the fabric 83. Preferably, most of all of the computers in the fabric 83 have the same capabilities. Within the fabric, any computer that breaks down can be replaced by any other edge servers that are identical to it. This increases the redundancy within the fabric 83, making the fabric more tolerant to faults such as server breakdowns.

One computer 85 within the fabric is preferably connected to a back-up database 86. This computer is thus known as the back-up server 85. The other computers can be used as edge servers 87 that local barcode collection set-ups 11 connect to. In some embodiments, there may also be an "in-store" edge server 88. An in-store edge server 88 is located within a store that, for instance, has multiple cashiers and thus multiple barcode-collection setups 11. An in-store edge server 88 does not participate in data or application sharing with other computers in the fabric 83.

The edge servers 87 may request resources from the back-up server 85, for example, when copies of the requested resources are not found elsewhere within the fabric 83. The requesting, sharing, and distribution of the resources require bidirectional data communication and propagation between any two computers in the fabric 83.

To send the data associated with certain "behaviour" that a user performs using the set-up 11, the set-up 11 locates a suitable edge server 87. The term "behaviour" relates to an activity, such as scanning a barcode or verifying a voucher, that the user performs using the barcode-collection set-up 11. The suitable edge server 87 may be, for example, the fabric's computer that is physically nearest the barcode collection set-up 11. An edge server 87 may be used by multiple barcode collection set-ups 11. The suitable edge server 87 may be located by the set-up 11 using a network domain name service. The fabric 83 helps optimize the efficiency of data and application transmission or sharing.

The edge server 87 that the collection set-up 11 is connect to performs tasks that are required to enable that activity, using relevant applications that are either locally cached or shared from the fabric.

An edge server 87 performs a certain task using one or more applications needed for that task. For examples, the applications may be grouped into sales applications, loyalty program applications, security applications, or customer records applications. In preferred embodiments, each application has an associated version code. Before running a certain application, the edge server 87 transmits that application's version code to the back-up server 85. This code is compared with that of the back-up server's copy of the same application, to ensure that the edge server's copy of the application is up-to-date. In the event the edge server's copy of the application is out-of-date, or the edge server 87 does not have that particular application, the edge server 87 it requests an up-to-date version of the application from the core server 85. In this scenario, the task is performed in approximate, but not true real time.

Every behaviour that is performed using a collection set-up 11 is transmitted to and recognized by an associated edge server 87 as an "event". Within the fabric structure, data associated with the event (or "event data") is backed up in three different ways. Firstly the event data is stored into the hard-disk of the edge server 87 that receives the event data from the barcode collection set-up where the corresponding behaviour is performed. The duration of this storage depends on the memory configuration of the edge server 87. Secondly, over time, one or more other computers 89 in the fabric may request this event data. The event data is therefore "backed up" over the distribution fabric 83. Thirdly, the event data is sent back to the back-up server 85 and stored in the back-up database 86. This third mechanism of backing-up is also referred to as the "back channel synchronization". The exact parameters of the back channel synchronization is not important, as long as all the data that originates from the barcode collection set-up 11 is safely stored in the back-up database 86.

The storage of event data within the edge server 87 makes it possible for retail information or other reports to be generated almost in real-time, provided all the data required for generating the report can be located from the edge server 87. In the case that the reports involve data not available on the local cache, for example older data or data from another computer 89 on the fabric, the report is generated only in approximate real time. This is because the edge server 87 would need to retrieve some data from another computer.

In the preferred embodiment, the edge server 87 has a software that is a statistics compiler for compiling statistics about what resources are utilized as it performs actions that are needed to execute a behaviour. For example, the edge server 87 keeps a log of the processing time and the amount of memory used during the execution of a behaviour. This statistics is used to build a visual representation, such as a graph of how different behaviours utilize different fabric resources. A developer or an administrator of the retail information system can also select or adjust metrics that define an optimized strategy for distributing the fabric resources and for executing different behaviours. For example, the metrics can be the location and the amount of memory used, or the path of data propagation within the fabric. The selection or adjustment of the metrics is preferably made based on the graphs generated from the statistics. The selection or adjustment makes it possible for an administrator to determine an optimal processing strategy for each behaviour. This optimisation helps ensure that the fabric resources are utilized in such a way that the execution of a behaviour is as close to real-time as possible.

In some examples, the cluster of computers within the fabric 83 may be configured to have a hierarchical architecture. For example, all the computers located in Sydney may distribute their data to one "city tier" computer 89 for Sydney. All the different computers from the "city tier" then distribute their data to a "state tier" computer 90 for New South Wales. More generally, the lower to higher tiers, in sequence, may correspond to territories or land areas of ever increasing size.

Distribution of data may also be categorized differently. For example, the distribution of data from a barcode collection set-up 11 to the edge server 87 used by that set-up is called "edge distribution". The distribution of data between computers from the same tier is peer distribution. The distribution of data between computers from different tiers is tier distribution.

The fabric 83 makes possible several functions. One such function is live profiling. Different users or clients of the retail information collection system may wish to access different types of reports generated by the system. For example, a client may wish to see the sales performance if its product and that of a competitor in the last two years. A retailer may wish to examine the customer information for his or her store for a certain month.

The set of parameters, which a user or a client uses to define the desired report, may be, for example, behaviours of interest, selection criteria for a behaviour, labelling and categorization of the event, or any other customized parameters. These parameters are collectively called a profile.

The profile may be defined such that the report only contains, for example, historical sales data. It may alternatively bet defined such that the report contains, for example, up-to-date sales data. Other examples of report profiles include, without limitation, average spend, number of items per basket, customer traffic, product categorisation, etc.

Figure 9:
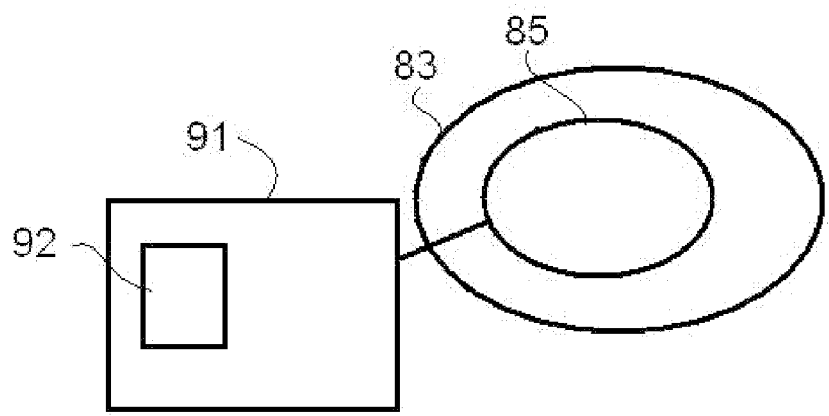
FIG. 9 is a schematic diagram depicting one embodiment of report profile submission.

Referring to FIG. 9, the user or client may log onto a website 91 and submit the profile 92 of his or her desired report. The website 92 may be maintained by the back-up server 85. In some embodiments, the source code for the website may be located in one of the edge servers. In some other embodiments, the source code of the website may include links to other websites whose sources codes are located in various edge servers.

The user or client may alternatively submit the profile 92 to an administrator of the retail information collection system. The administrator may then enter the desired profiles into the fabric 83. Once a profile for a report is established, any transaction or data collection that is relevant to the report is updated to the report.

Figure 10:
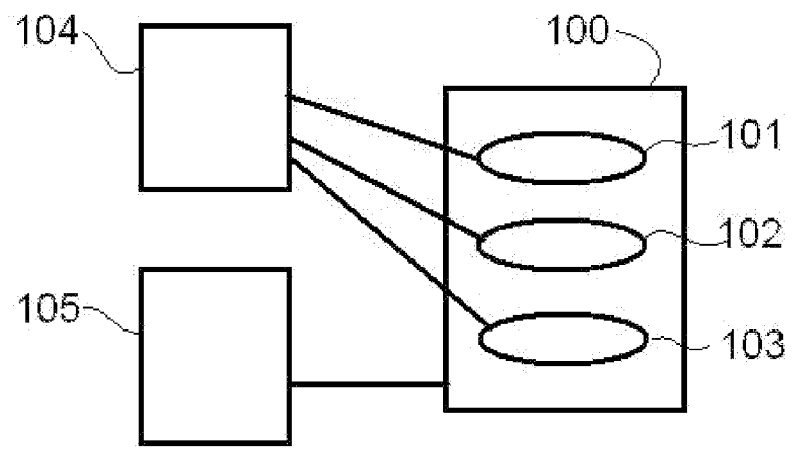
FIG. 10 is a schematic diagram depicting the strategic process automation.

In further preferred embodiments, a strategic process automation (SPA) is used to manage the retail information collection system within the framework of the distribution fabric. Referring to FIG. 10, SPA 100 consists of modules or plug-ins 101, 102 that are published within the fabric. The SPA modules or plug-ins used comprise a process strategy modeller 101, a data collection modeller 102, and a process status monitor 103. Using a process strategy modeller 101, a developer or an administrator creates new processes to match a real-world scenario. a developer or an administrator of the retail information system can download the SPA plug-ins 101, 102, 103 onto his or her own computer 104 and work through these modules. Alternatively, these modules may be published, as web applications, on a website 105 supported by the fabric.

The modules or plug-ins are software tools used, by a developer or an administrator of the retail information system, to model a real-world scenario, and how the data relevant for that scenario is collected and propagated within the fabric. Once such a model is established, it is used as a template that is applied to all future instances of the same scenario. Hence, within the context of SPA, a "process" is an automated model that corresponds to a real-world scenario.

Figure 11:
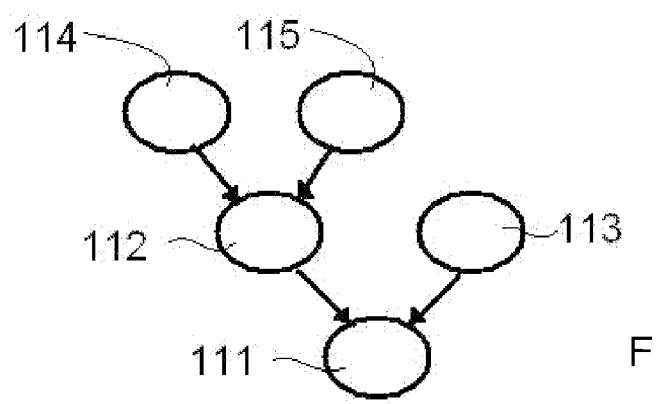
FIG. 11 is a schematic diagram depicting one example of a root process and its pre-requisite processes.

Referring to FIG. 11, a process (or "root process") 111 may have "pre-requisite" processes 112, 113. The pre-requisite processes must be completed before the root process can begin. A pre-requisite process 112 may have its own further pre-requisite processes 114, 115. Consider a process for the real-world scenario of installing a barcode collection set-up at a retail location. One pre-requisite process 112 in this case would be an existing connection to a communications network at the retail location. Another pre-requisite process 113 would be the successful entry and handling of the retail location's address and telephone line data.

Figure 12:
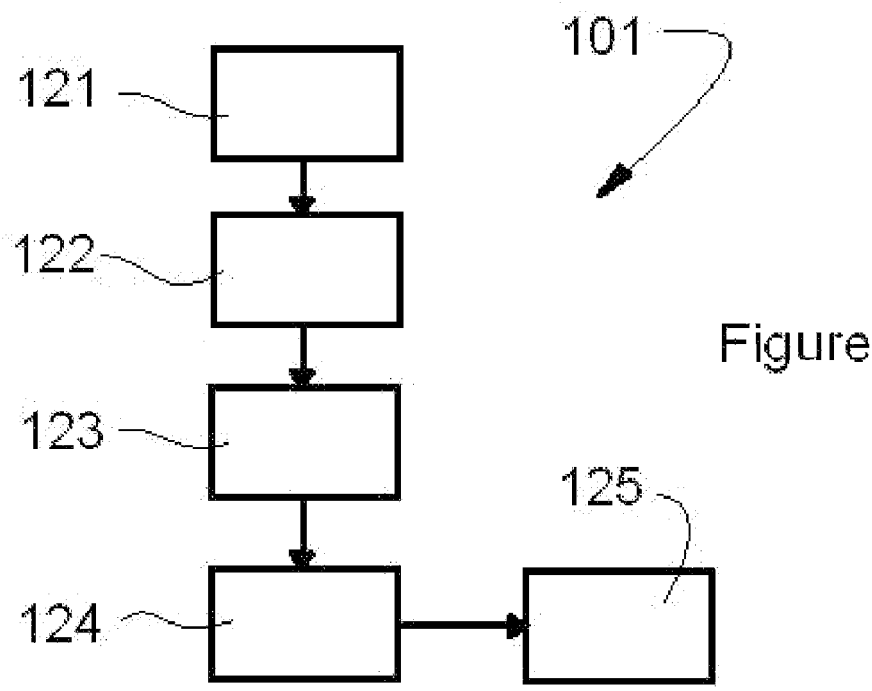
FIG. 12 is a flowchart depicting one example of a strategic strategy modeller.

As shown in FIG. 12, the process strategy modeller 101 prompts the developer or administrator to identify a process 121 and identify its pre-requisite processes 122. The developer is then prompted to define parameters 123 such as the expected completion time for the process 121 and its pre-requisite processes 122, or the triggers that initiate the process and its pre-requisite processes. For example, a process for installing a barcode collection set-up may be initiated when a retail manager sends a request to the administrator. The receipt of the request is thus the trigger.

It is preferred that the process strategy modeller also prompts the developer or administrator to define one or more known exceptions 124 (or "errors") that may occur during the completion of a process, and how these exceptions are handled 125. One possible exception in the case of installing a new barcode collection set-up is an erroneous entry of the retail store's location.

The design of the SPA takes into account the fact that in real life, may exceptions occur unexpectedly. Therefore, in preferred embodiments, each process created using the process strategy modeller incorporates a routine 126 that passes exceptions to an administrator or developer for resolution or consideration.

Figure 13:
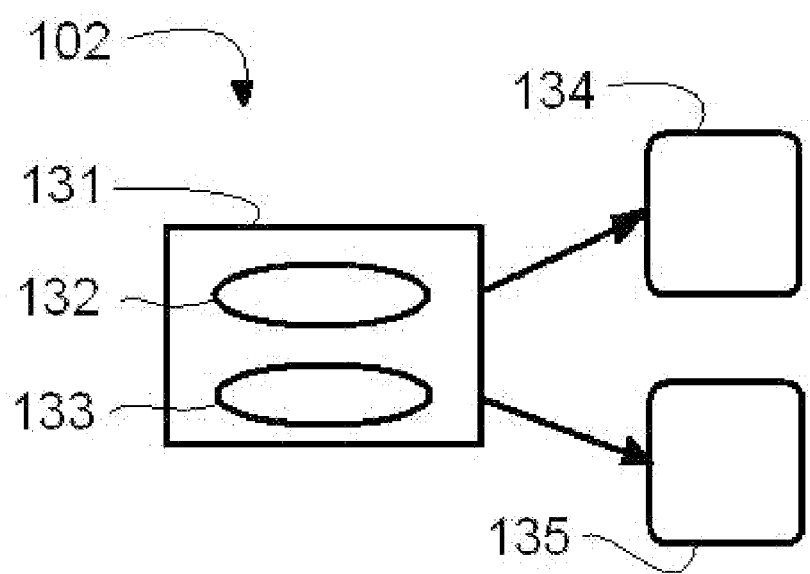
FIG. 13 is a schematic diagram depicting one example of a data collection modeller.

As shown in FIG. 13, using the data collection modeller 102, the administrator or developer builds a strategy information model 131. The strategy information model 131 specifies the nature 132 and format 133 of data required for the process. For example, the data may be the retail store's address and phone number. The format for the address data is alpha-numerical, whereas the format for the phone number is an 11 digit number. The strategy information model can be published as a web-based form 134. It can also be published as, for example, a PDF form 135. The form is available from the web, and may be used for the entry and modification of data.

The process for a real-life scenario and the relevant format of data collection are defined using the process strategy modeller 101 and data collection modeller respectively 102. After a trigger for a certain process is detected, the administrator or developer can monitor the progress of the process using the process status monitor 103. Using the process status monitor, the administrator or developer can also view and handle exceptions that occur during the running of a process. Like the process strategy modeller and data collection modeller, the process status monitor is accessible on the web. The administrator or developer can thus oversee the process from the internet.

Some real-world scenarios occur more commonly than others. Some examples include collecting a retailer's address data from a PDF form, writing the retailer's specifics to a file, and entering the retailer's specifics in a spreadsheet. The SPA incorporates components that are predefined processes for these common scenarios. One example is the data collection component. The data collection component is a process or a group of processes that deal with any incoming data. Other components related to data handling processes include the web data collection component, the PDF data collection component, PDF generation component, and the web data modification component. Further examples of components include: batch controller, batch processor, batch monitor, protocol reader/writer, file reader/writer, core model reader/writer, spreadsheet generators, and message agents.

Figure 14:
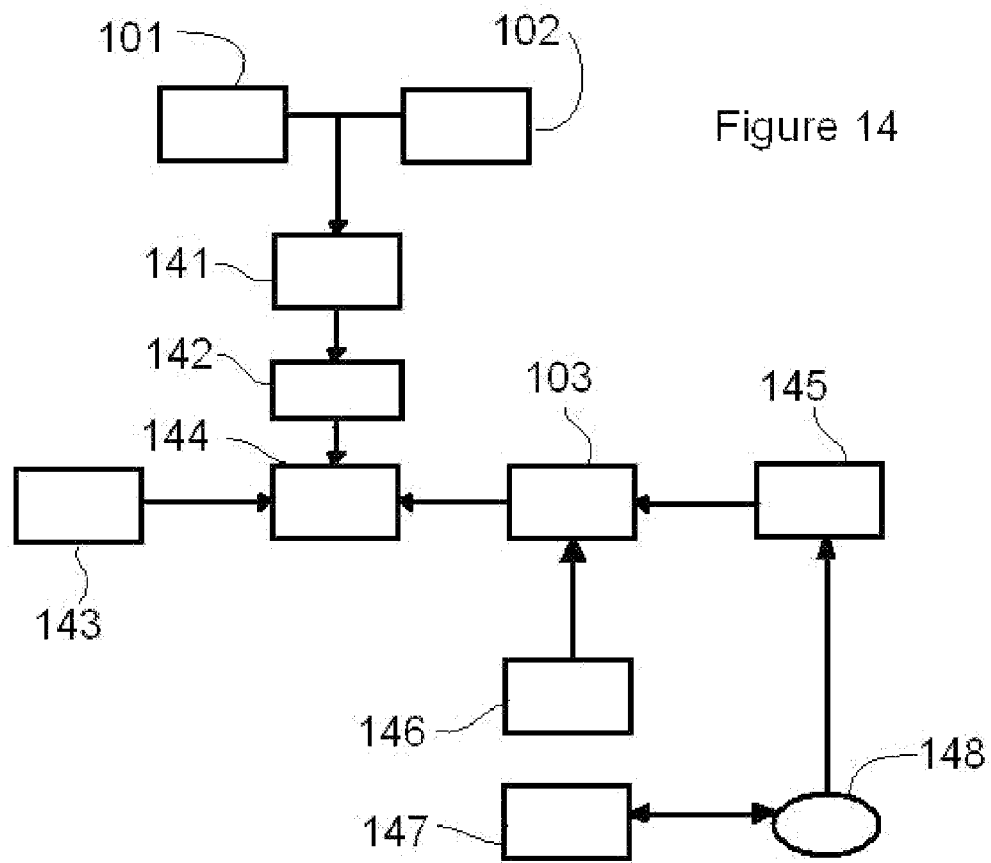
FIG. 14 is a schematic diagram depicting a barcode collection set-up installation process modelled and monitored using the strategic process automation.

Referring to FIG. 14, the working of the SPA is explained in the example of installing a new barcode collection set-up in the marketplace. Using the process strategy modeller 101 and the data collection modeller 102, a barcode collection set-up installation process 141 is generated. The process (or "model") is then published within the fabric 142.

A staff or a manager for a retail store submits an order (or "sales order") for the barcode collection set-up. In this example, this order is submitted as a filled PDF form that is emailed to an administrator. The PDF form has been prior generated using the data collection modeller. The receipt of the sales order by the administrator 143 triggers a new instance of the installation process 144. The administrator 145 monitors the process using the process status monitor 103. Through the status monitor 103, the administrator 145 may modify relevant data 146. The administrator 145 may also collect more data 147 through email 148.

Figure 15:
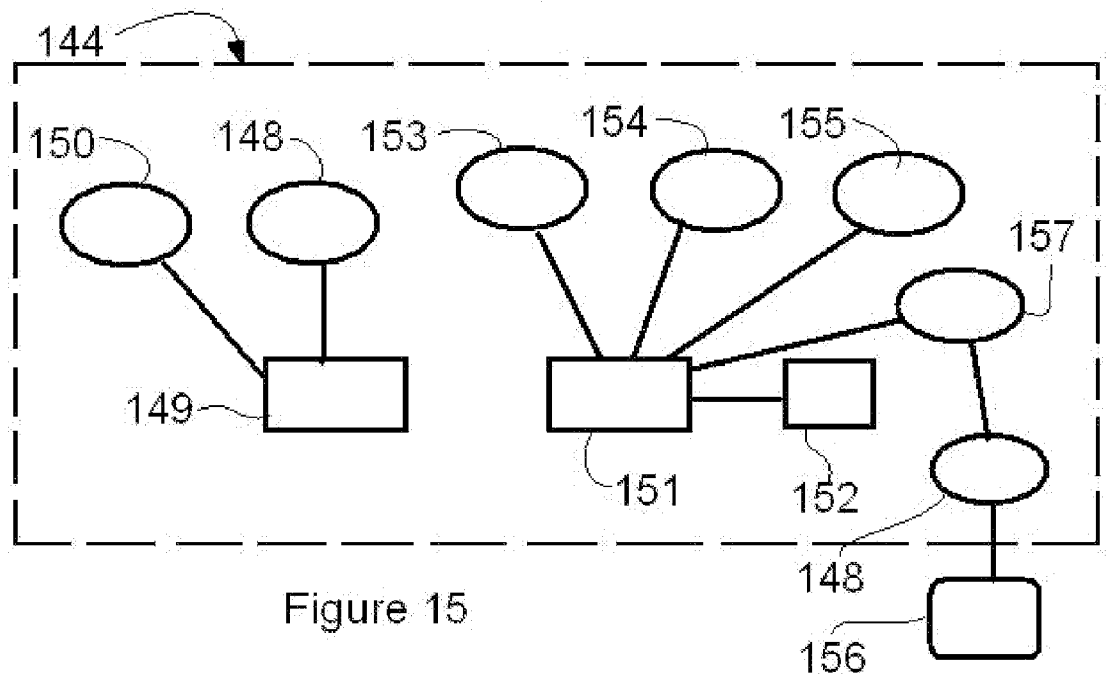
FIG. 15 is a schematic diagram depicting pre-requisite processes of a barcode collection set-up installation process.

Referring to FIG. 15, a pre-requisite process for the installation process is the sales-order process 149. The sales order process includes sub-processes. One sub-processes is using a mail message agent component 148 to check for incoming mail messages. A PDF data collection component 150 then reads, verifies, and stores the data on the submitted PDF form. The mail message agent component 148 is then again invoked to deliver an email confirmation to the staff or manager who requested the sales order. The mail message agent component 148 is also invoked to deliver a rejection message to the staff or manager, in case the sales order is not successfully completed.

In this example, the staff or manager selects the "produce loyalty cards" box in the filled PDF form. Hence, another pre-requisite process for the installation process 144 is the "loyalty card production process" 151. The trigger for the "loyalty card production process" 151 is the checking or selection of the "produce loyalty cards" box 152. The loyalty card production process has a number of pre-requisite processes as described below.

Loyalty cards are produced by a third party card manufacturer. The card manufacturer requires batches of purchase orders for the cards. The batch processing component 153 therefore invoked to collect sales orders, for example, on a daily basis. The core model reader/writer component 154 is invoked to request loyalty card numbers for the retail information collection system. The spreadsheet generator component 155 is then invoked, so that information such as labelling and magnetic stripe information can be inserted into a spreadsheet. The PDF generation component 157 is also invoked to produce mailing labels for the loyalty cards. The mail message component 148 sends an email to the card manufacturer 156, the email having the card information spreadsheet and the mailing label as attachments. The mail message component is also used to monitor email responses from the card manufacturer, to detect confirmation that the cards have been produced and shipped to the retailer.

Because of the security standard built into the fabric used by the retail information collection system, the above barcode collection set-up, distribution fabric, and SPA can be used for other applications. For example, the set-up and fabric can be used for customers to order phone cards or movie tickets in a retail store. The purchase request is sent via the fabric to a phone card company or a movie theatre. The phone card company or movie theatre then sends a voucher back to the retail store to be printed out. The same set-up may also be used to complete a financial transaction. The financial institution can route and receive data through the fabric, instead of through an encrypted network separate to that used for the purchase data transactions.

While the present invention has been disclosed with reference to particular details of construction, these should be understood as having been provided by way of example and not as limitations to the scope or spirit of the invention. For instance, the type of communication network over which data transmission occurs is not relevant to the invention. The type of application device, the operating platform of the device may also be changed. Further, the format of host messages, and how these message are printed or displayed, can be altered.

What is claimed is:

1. An apparatus for retail information collection, comprising:
   a card reader; and
   a Y-cable having an input port and two output ports;
   the input port being connected to a barcode scanner, one output port being connected to the card reader, and the other output port being connected to an electronic cash register;
   the Y-cable being adapted to route a barcode data from the barcode scanner simultaneously to the card reader and to the electronic cash register;
   the card reader having loaded onto it a software comprising a retail information collection application;
   the application being adapted to process received retail information data relating to a customer transaction, including one or more barcode data and one or more financial data, and transmit sanitized retail information data over a network;
   wherein the retail information data is based on the barcode data; and
   wherein the application comprises:
      a product list compiler process for compiling a product list indicative of the received retail information data relating to the customer transaction;
      an sanitization process for removing selected one or more financial data of the received retail information data to provide a sanitized retail information data that is transmittable over the network; and
      a timer process for identifying completion of a retail transaction and automated deployment of the sanitized retail information data after the completion of a retail transaction.

2. The apparatus of claim 1, wherein,
   the card reader comprises a display area for depicting a display based on the barcode data of products purchased in a transaction.

3. The apparatus of claim 1, wherein,
   the card reader further comprises an auxiliary port buffer that is adapted to temporarily store incoming barcode data when the application cannot immediately compile the product list.

4. The apparatus of claim 1, wherein,
the application supports two different types of network connections, a first type being a default connection, a second type being a backup connection.

5. The apparatus of claim 1, wherein,
the timer process is further adapted for time-stamping the retail information data.

6. The apparatus of claim 1, wherein,
the application is adapted to transmit the sanitized retail information data over the network to a computer at a predetermined time interval after a last barcode scan.

7. The apparatus of claim 1, wherein,
the card reader further comprises a memory bank for receiving and storing the barcode data.

8. The apparatus of claim 1, wherein,
the application receives a data from a computer that receives the retail information data over the network.

9. The apparatus of claim 8, further comprising,
a printer that is adapted to receive and print the data from the computer, wherein the data from the computer comprises a targeted advertising message.

10. The apparatus of claim 1, wherein,
the received retail information data includes a one or more personal data; and
the application removes a selected personal data from the received retail information data prior to transmitting the sanitized retail information data over the network.

11. The apparatus of claim 1, wherein,
the application encrypts the sanitized retail information data transmitted over the network.

12. The apparatus of claim 1, wherein,
the application further comprises a user management module, the user management module allowing a first user a first level of security access to the application, and a second user a second level of security access to the application.

13. The apparatus of claim 1, wherein,
the application further comprises a manual override module, and the credit card reader further comprises a keypad area, wherein a user manually enters the barcode data using the keypad area.

14. The apparatus of claim 1, the apparatus further comprising a computer coupled to the network for receiving the transmitted sanitized retail information data;
wherein the computer comprises in its memory a data source for a website that a client can log onto to view received sanitized retail information data.

15. The apparatus of claim 1, wherein,
the application further comprises a log-on module, the log-on module transmitting a unique terminal device identifier for identifying the card reader.

16. The apparatus of claim 1, wherein,
the application further comprises a user interface module, the user interface module allowing a user to pause a barcode collection, resume the barcode collection, cancel the barcode collection, or view a list of collected barcodes.

17. An apparatus for retail information collection, comprising:
a terminal device that is adapted to receive a retail information data, the retail information data being based on at least one barcode data and at least one financial data relating to a customer transaction;
the terminal device having loaded onto it a retail information collection application;
the application processing the retail information data;
the application being adapted to transmit sanitized retail information data over a communications network;
wherein the application comprises:
a product list compiler process for compiling a product list indicative of the received retail information data relating to the customer transaction;
an sanitization process for removing selected one or more financial data of the received retail information data to provide a sanitized retail information data that is transmittable over the network; and
a timer process for identifying completion of a retail transaction and automated deployment of the sanitized retail information data after the completion of a retail transaction.

18. The apparatus of claim 17, wherein,
the received retail information data includes a one or more personal data; and
the application removes a selected personal data from the retail information data prior to transmitting the sanitized retail information data over the network.

19. The apparatus of claim 17, wherein,
the application is adapted to receive a data from a computer that receives the sanitized retail information data over the network.

20. The apparatus of claim 17, wherein,
the application is adapted to transmit the compiled sanitized retail information data subsequent to a predetermined time interval passing after receiving a last retail information data.

* * * * *